(12) United States Patent
Davis et al.

(10) Patent No.: US 11,724,792 B2
(45) Date of Patent: Aug. 15, 2023

(54) COMPOSITE AIRFOIL FOR AN AIRCRAFT

(71) Applicant: Rohr, Inc., Chula Vista, CA (US)

(72) Inventors: Jennifer Davis, La Jolla, CA (US);
Alan K. Cheung, La Mesa, CA (US);
Paul Dsouza, Poway, CA (US); Gerald S. Abille, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 16 days.

(21) Appl. No.: 17/474,442

(22) Filed: Sep. 14, 2021

(65) Prior Publication Data

US 2023/0082202 A1 Mar. 16, 2023

(51) Int. Cl.
*B64C 3/20* (2006.01)
*B64C 5/02* (2006.01)
*B64C 3/18* (2006.01)

(52) U.S. Cl.
CPC ............... *B64C 3/20* (2013.01); *B64C 3/185* (2013.01); *B64C 5/02* (2013.01)

(58) Field of Classification Search
CPC .... B64C 3/20; B64C 3/24; B64C 3/18; B64C 3/182; B64C 3/184; B64C 3/187
See application file for complete search history.

(56) References Cited

U.S. PATENT DOCUMENTS

| | | | |
|---|---|---|---|
| 7,205,066 B1 | 4/2007 | Hammi | |
| 7,238,409 B1 | 7/2007 | Peterson | |
| 9,421,698 B2 | 8/2016 | Miller | |
| 9,527,238 B2 | 12/2016 | Kruckenberg | |
| 9,981,735 B2 | 5/2018 | Reusch | |
| 10,744,747 B2 | 8/2020 | Gruner | |
| 10,864,658 B2 | 12/2020 | Fiegl | |
| 2005/0236524 A1* | 10/2005 | Sarh | B64C 3/18 244/124 |
| 2011/0211965 A1 | 9/2011 | Deal | |
| 2013/0068888 A1* | 3/2013 | Smith | B64C 3/24 416/226 |
| 2016/0297512 A1* | 10/2016 | Dan-Jumbo | B32B 27/38 |
| 2017/0297279 A1 | 10/2017 | Fiegl | |
| 2020/0386240 A1 | 12/2020 | Watson | |
| 2021/0032997 A1 | 2/2021 | Bales | |
| 2021/0114749 A1 | 4/2021 | Humfeld | |

* cited by examiner

*Primary Examiner* — Timothy D Collins
*Assistant Examiner* — Eric Acosta
(74) *Attorney, Agent, or Firm* — Getz Balich LLC

(57) ABSTRACT

An airfoil body is provided for an aircraft which includes a first skin, a second skin, a plurality of first stiffeners and a plurality of second stiffeners. The first stiffeners are configured from or otherwise include first stiffener composite material. The first stiffeners extends widthwise between and are connected to the first skin and the second skin. Each of the first stiffeners has a first stiffener longitudinal centerline that extends spanwise along the first skin and the second skin. The second stiffeners are configured from or otherwise include second stiffener composite material. The second stiffeners extend widthwise between and are connected to the first skin and the second skin. Each of the second stiffeners has a second stiffener longitudinal centerline that extends lengthwise along the first skin and the second skin.

16 Claims, 7 Drawing Sheets

COMPOSITE AIRFOIL FOR AN AIRCRAFT

BACKGROUND

1. Technical Field

This disclosure relates generally to an aircraft and, more particularly, to a composite control surface airfoil for the aircraft.

2. Background Information

An aircraft includes various types of aircraft airfoils such as stabilizers. A stabilizer typically projects out from a fuselage of the aircraft at a tail end of the aircraft. Various types of stabilizers are known in the art. While these known stabilizers have various benefits, there is still room in the art for improvement.

SUMMARY OF THE DISCLOSURE

According to an aspect of the present disclosure, an apparatus is provided for an aircraft. This aircraft apparatus includes an airfoil body extending spanwise between a base end and a tip end. The airfoil body extends lengthwise between a leading edge and a trailing edge. The airfoil body extends widthwise between a first side and a second side. The airfoil body includes a first skin, a second skin, a plurality of first stiffeners and a plurality of second stiffeners. The first skin is disposed at the first side. The second skin is disposed at the second side. The first stiffeners are configured from or otherwise include first stiffener composite material. The first stiffeners extend widthwise between and are connected to the first skin and the second skin. Each of the first stiffeners has a first stiffener longitudinal centerline that extends spanwise along the first skin and the second skin. The second stiffeners are configured from or otherwise include second stiffener composite material. The second stiffeners extend widthwise between and are connected to the first skin and the second skin. Each of the second stiffeners has a second stiffener longitudinal centerline that extends lengthwise along the first skin and the second skin.

According to another aspect of the present disclosure, another apparatus is provided for an aircraft. This aircraft apparatus includes an airfoil body extending spanwise between a base end and a tip end. The airfoil body extends lengthwise between a leading edge and a trailing edge. The airfoil body extends widthwise between a first side and a second side. The airfoil body includes a first skin, a second skin, a first section and a second section. The first skin forms the first side. The second skin forms the second side. The first section includes a first portion of the first skin, a first portion of the second skin and a plurality of first stiffeners. The first stiffeners are configured from or otherwise include first stiffener polymer material. The first stiffeners are connected to and extend widthwise between the first skin and the second skin. The second section is mechanically attached to the first section. The second section includes a second portion of the first skin, a second portion of the second skin and a plurality of second stiffeners. The second stiffeners are configured from or otherwise include second stiffener polymer material. The second stiffeners are connected to and extend widthwise between the first skin and the second skin.

According to still another aspect of the present disclosure, another apparatus is provided for an aircraft. This aircraft apparatus includes an airfoil body, a receptacle and a fitting. The airfoil body is configured from or otherwise includes fiber-reinforced composite material. The airfoil body extends spanwise between a base end and a tip end. The airfoil body extends lengthwise between a leading edge and a trailing edge. The airfoil body extends widthwise between a first side and a second side. The airfoil body includes a first skin, a second skin and a plurality of ribs connected to and extending widthwise between the first skin and the second skin. The ribs include a first rib and a second rib. The receptacle projects spanwise into the airfoil body from the base end. The receptacle extends lengthwise within the airfoil body from the first rib to the second rib. The receptacle extends widthwise from the first skin to the second skin. The fitting includes a mount and an attachment. The mount is received within the receptacle and is mechanically fastened to the airfoil body. The mount has a maximum spanwise dimension that is equal to or less than a minimum spanwise dimension between the first rib and the second rib at the base end. The attachment projects out from the airfoil body and is configured for attachment to another component of the aircraft.

The first stiffener composite material and the second stiffener composite material may each be or otherwise include a fiber reinforced polymer.

The first skin may be configured from or otherwise include first skin composite material. The second skin may be configured from or otherwise include second skin composite material.

Each of first stiffeners may extend spanwise to a distal first stiffener end at the tip end. Each of the second stiffeners may extend lengthwise to a distal second stiffener end at the leading edge.

The airfoil body may also include a third stiffener and a plurality of fourth stiffeners. The third stiffener may be configured from or otherwise include third stiffener composite material. The third stiffener may be spanwise between and adjacent the first stiffeners and the fourth stiffeners. The third stiffener may be widthwise between the first skin and the second skin. The third stiffener may have a third stiffener longitudinal centerline that extends lengthwise along the first skin and the second skin. The fourth stiffeners may be configured from or otherwise include fourth stiffener composite material. The fourth stiffeners may be widthwise between the first skin and the second skin. Each of fourth stiffeners may have a fourth stiffener longitudinal centerline that extends spanwise along the first skin and the second skin.

Each of the first stiffeners may extend spanwise from the third stiffener to a distal first stiffener end at the tip end. Each of the fourth stiffeners may extend spanwise from the third stiffener to a distal fourth stiffener end at the base end.

One or more of the second stiffeners may be spanwise aligned with the first stiffeners. One or more of the second stiffeners may be spanwise aligned with the fourth stiffeners.

The leading edge may include a first segment and a second segment. The first segment may be arranged at the tip end. The second segment may be arranged at the base end and lengthwise recessed inward from the first segment. The second stiffeners may be arranged along the second segment.

The airfoil body may include a first section and a second section that is attached to the first section. The first section may include a first portion of the first skin, a first portion of the second skin and the first stiffeners. The second section may include a second portion of the first skin, a second portion of the second skin and the second stiffeners.

The first section may be mechanically attached to the second section.

The first section may be configured as a first monolithic body. The second section may also or alternatively be configured as a second monolithic body.

The airfoil body may also include a cover. The cover may be attached to the first section. The cover may spanwise and lengthwise overlap a portion of the first section. The cover may form a third portion of the first skin.

The apparatus may also include a fitting including a mount and a shaft. The mount may be received within a cavity of and may be attached to the airfoil body. The shaft may project away from the airfoil body to a distal shaft end.

The apparatus may also include an aircraft stabilizer. This aircraft stabilizer may be configured as or otherwise include the airfoil body.

Each of the first stiffeners may have a first stiffener centerline that extends spanwise along the first skin and the second skin. Each of the second stiffeners may have a second stiffener centerline that extends lengthwise along the first skin and the second skin.

The first section may be configured as a first monolithic body. The second section may be configured as a second monolithic body.

The first section may extend spanwise from the base end to the tip end, and lengthwise from the leading edge to the trailing edge. The second section may extend spanwise from base end to the first section, and lengthwise from the first section to the leading edge.

The airfoil body may also include a cover mechanically attached to the first section. The cover may spanwise and lengthwise overlap a portion of the first section. The cover may form a third portion of the first skin.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
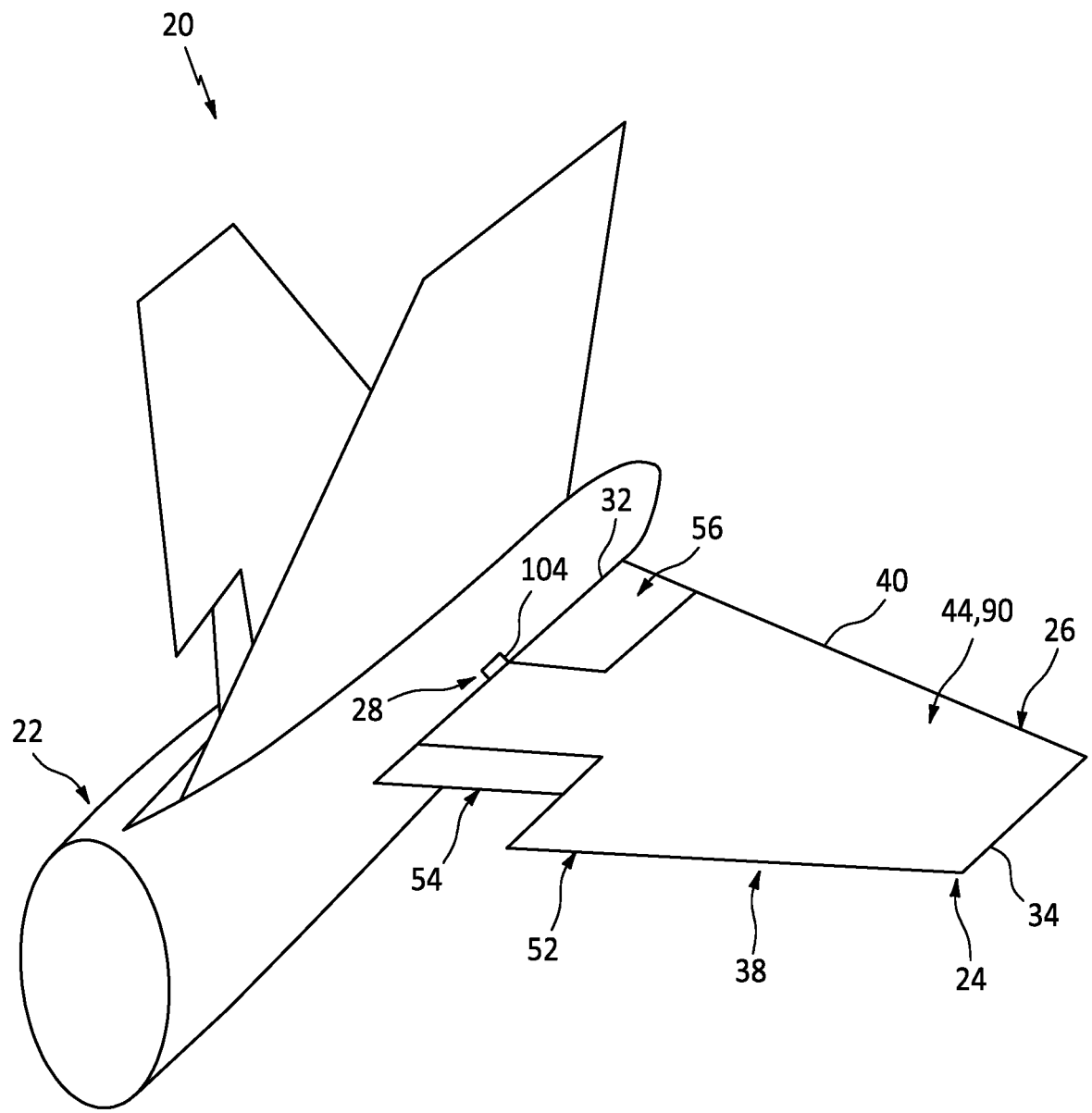
FIG. 1 is an illustration of an aft portion of an aircraft with a plurality of control surfaces.

FIG. 1 illustrates an assembly 20 for an aircraft. This aircraft may be configured as an airplane, a helicopter, a drone, a rocket or any other device which travels through air and/or space. The aircraft assembly 20 of FIG. 1 includes an aircraft base structure 22 and an aircraft airfoil 24 mounted to the aircraft base structure 22.

The aircraft base structure 22 may be configured as any structure of the aircraft which may support the aircraft airfoil 24. The aircraft base structure 22, for example, may be configured as a fuselage of the aircraft. In another example, the aircraft base structure 22 may be configured as a tail of the aircraft.

Figure 2:
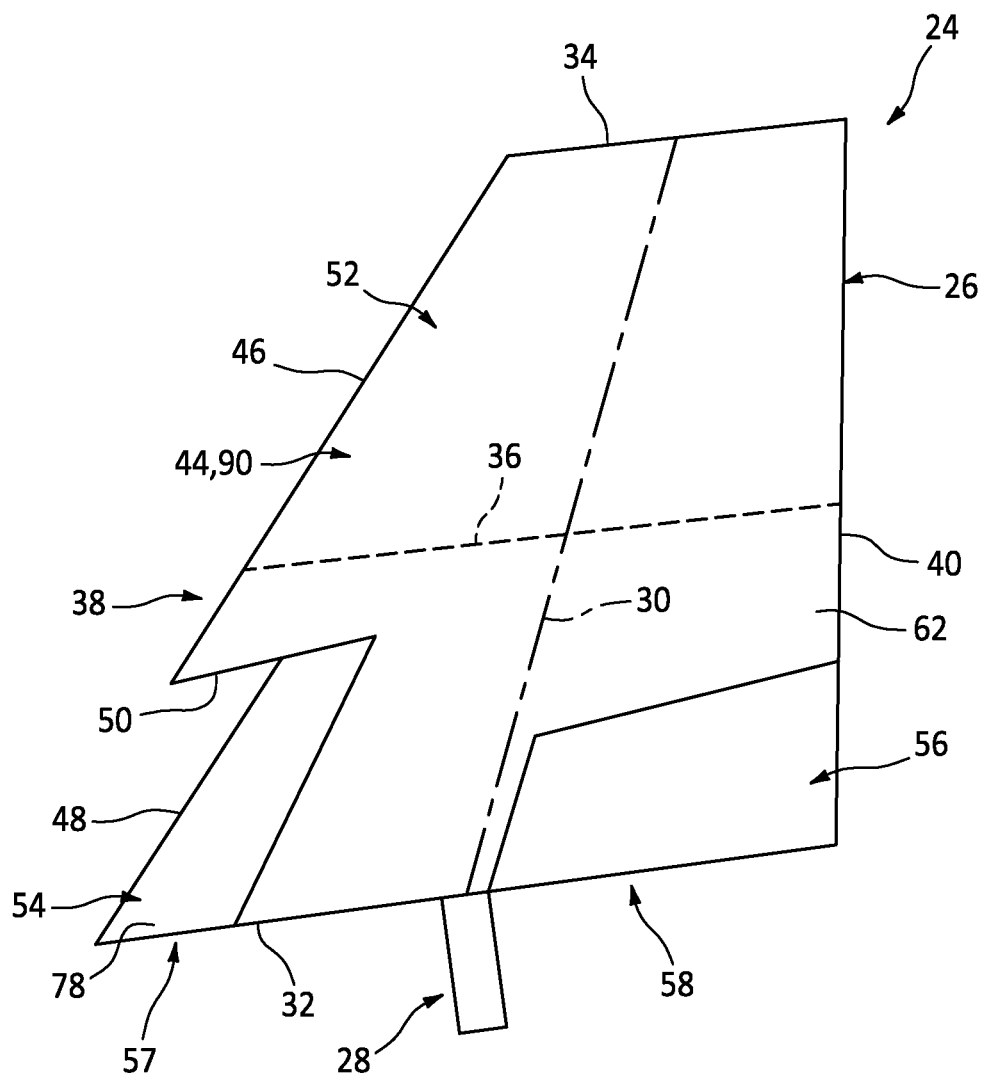
FIG. 2 is a side view illustration of the aircraft airfoil.

The aircraft airfoil 24 may be configured with an aircraft flight control surface. The aircraft airfoil 24 of FIG. 1, for example, is configured as a variable (e.g., movable) stabilizer; e.g., a horizontal stabilizer. However, in other embodiments, the aircraft airfoil 24 may be configured as a rudder, a flap, a wing or any other aircraft component which facilitates, for example, flight control and/or aircraft lift. Referring to FIG. 2, the aircraft airfoil 24 includes an airfoil body 26 and an airfoil fitting 28.

Figure 3:
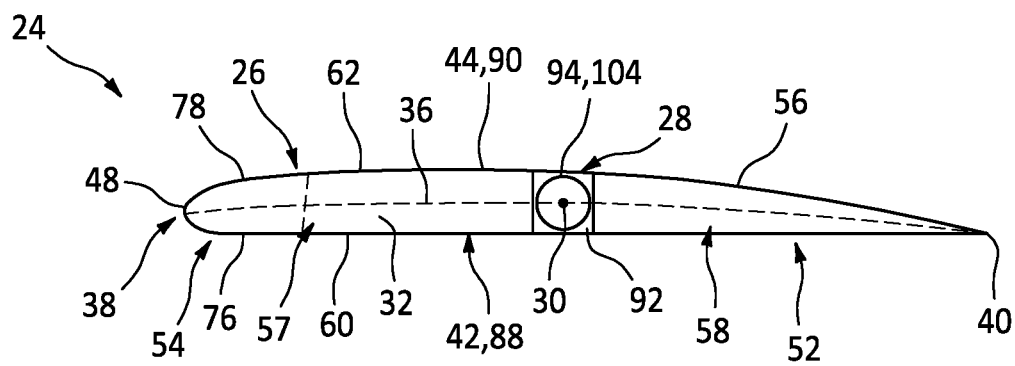
FIG. 3 is an end view illustration of the aircraft airfoil.

The airfoil body 26 extends spanwise along a centerline 30 (e.g., a span line) of the airfoil body 26 between and to (or about) a base end 32 (e.g., a root end) of the airfoil body 26 and a tip end 34 of the aircraft airfoil 24. The airfoil body 26 extends lengthwise along a camber line 36 of the airfoil body 26 between and to (or about) a leading edge 38 of the aircraft airfoil 24 and a trailing edge 40 of the aircraft airfoil 24. Referring to FIG. 3, the airfoil body 26 extends widthwise (e.g., transverse to the airfoil body centerline 30 and/or the camber line 36) between and to (or about) opposing exterior sides 42 and 44 of the aircraft airfoil 24.

The airfoil leading edge 38 of FIG. 2 includes an outer segment 46 and an inner segment 48. The leading edge outer segment 46 is arranged at the airfoil tip end 34. The leading edge outer segment 46, for example, extends spanwise along the airfoil body 26 from the leading edge inner segment 48 to the airfoil tip end 34. The leading edge inner segment 48 is arranged at the airfoil body base end 32. The leading edge inner segment 48, for example, extends spanwise along the airfoil body 26 from the leading edge outer segment 46 to the airfoil body base end 32. This leading edge inner segment 48 of FIG. 2 is also lengthwise recessed inward from the leading edge outer segment 46 by a lengthwise distance. With this arrangement, a shoulder 50 (e.g., an offset, a jog, etc.) extends lengthwise between and to an inner end of the leading edge outer segment 46 and an outer end of the leading edge inner segment 48.

The airfoil body 26 of FIGS. 2 and 3 includes an airfoil body primary section 52 and an airfoil body secondary section 54. The airfoil body 26 of FIGS. 2 and 3 also includes one or more covers 56-58; e.g., skins, closeouts, etc.

Figure 4:
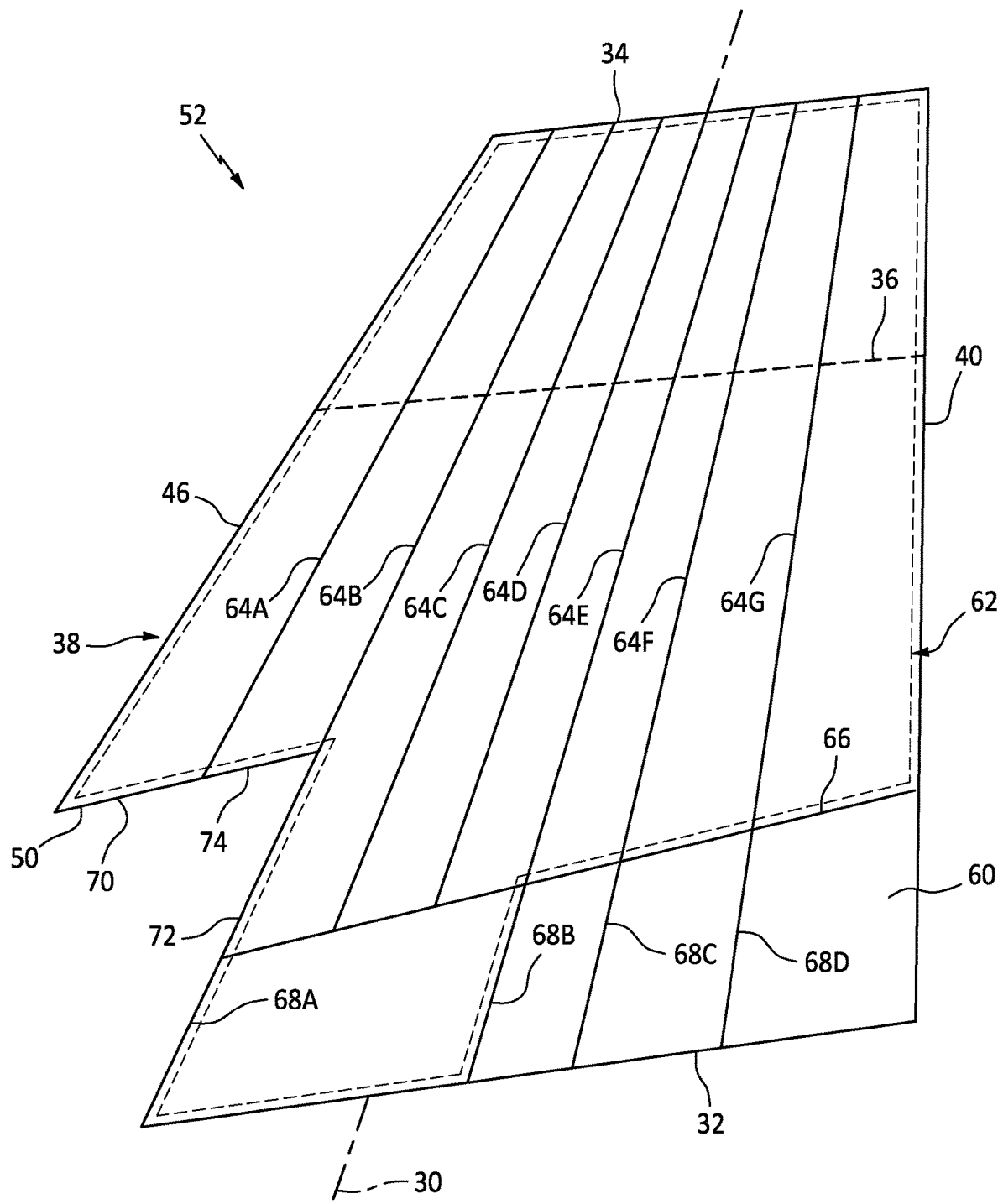
FIG. 4 is a side view illustration of a primary section of an airfoil body with its closest skin shown in transparent form via dashed lines.
Figure 5:
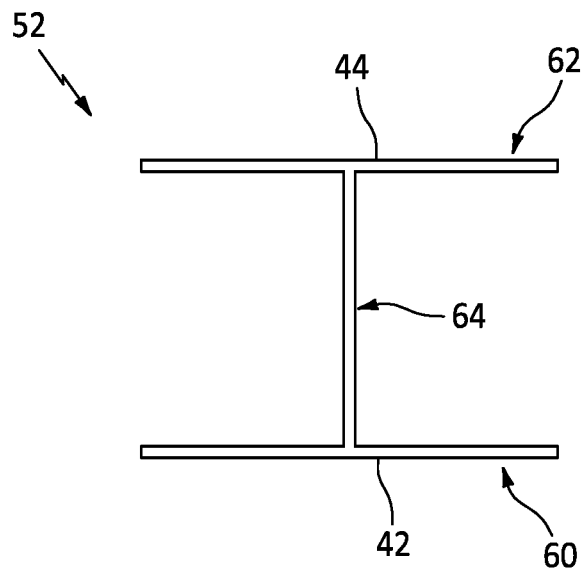
FIG. 5 is a cross-sectional illustration of a stiffener in the airfoil body primary section.
Figure 6:
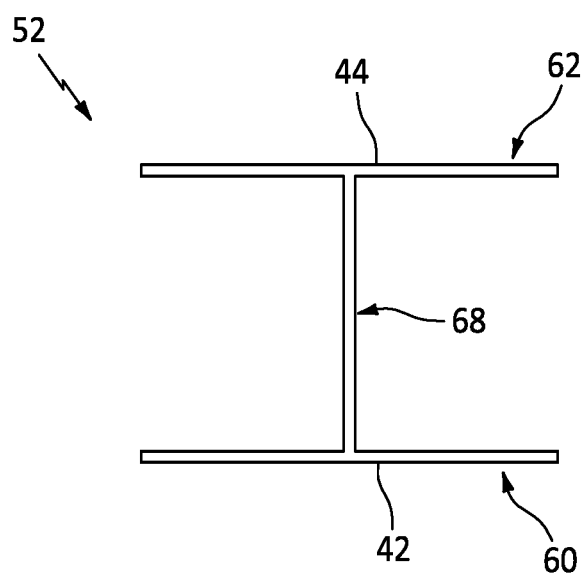
FIG. 6 is a cross-sectional illustration of another portion of the airfoil body primary section.

Referring to FIG. 4, the airfoil body primary section 52 includes an internal support structure. Referring to FIGS. 5 and 6, the airfoil body primary section 52 also includes a primary section first skin 60 and a primary section second skin 62 (generally shown via dashed line in FIG. 4).

Referring to FIG. 4, the primary section support structure is configured to support (e.g., provide a frame for) the primary section skins 60 and 62 (see FIGS. 5 and 6). The primary section support structure of FIG. 4 includes a plurality of primary section stiffeners 64A-G (generally referred to as "64"), 66, 68A-D (generally referred to as "68") and 70. These primary section stiffeners 64, 66, 68 and 70 may be configured as ribs, spars, bulkheads and/or sidewalls internal to the airfoil body primary section 52.

The outer stiffeners 64 of FIG. 4 are arranged in a lengthwise extending array, where the outer stiffeners 64 within this array may be parallel with the airfoil body centerline 30 and/or slightly angularly offset (e.g., by an angle less than fifteen degrees)(15°) from the airfoil body centerline 30. The outer stiffeners 64, for example, are distributed side-by-side along a length of the airfoil body primary section 52 at the airfoil tip end 34. Each neighboring (e.g., adjacent) pair of the outer stiffeners 64 are displaced from one another by a lengthwise distance. The outer stiffener 64A closest to the leading edge outer segment 46 is displaced from the airfoil leading edge 38 and its outer segment 46 by a lengthwise distance. The outer stiffener 64G closest to the airfoil trailing edge 40 is displaced from the airfoil trailing edge 40 by a lengthwise distance. Each of the outer stiffeners 64B-G extends longitudinally along a respective centerline of the respective outer stiffener 64B-G, where each outer stiffener 64B-G and its centerline extend spanwise along the primary section skins 60 and 62 (see FIG. 5) from the intermediate stiffener 66 to a respective distal end of the respective outer stiffener 64B-G at the airfoil tip end 34. The outer stiffener 64A extends longitudinally along a centerline of that outer stiffener 64A, where the outer stiffener 64A and its centerline extend spanwise along the primary section skins 60 and 62 (see FIG. 5) from the end stiffener 70 to a respective distal end of the respective outer stiffener 64A at the airfoil tip end 34. Referring to FIG. 5, each of the outer stiffeners 64 is arranged widthwise between the primary section first skin 60 and the primary section second skin 62. Each of the outer stiffeners 64 of FIG. 5, for example, extends widthwise between and is connected to (e.g., formed integral with, bonded to, etc.) the primary section first skin 60 and the primary section second skin 62.

The intermediate stiffener 66 of FIG. 4 is arranged spanwise between the outer stiffeners 64B-G and the inner stiffeners 68. The intermediate stiffener 66 may also be connected to (e.g., formed integral with, bonded to, etc.) the outer stiffeners 64B-G and/or the inner stiffeners 68. The intermediate stiffener 66 extends longitudinally along a centerline, where the intermediate stiffener 66 and its centerline extend lengthwise along the primary section skins 60 and 62 between and to opposing ends of the intermediate stiffener 66. The first end is located at a side 72 of the airfoil body primary section 52. The second end is located at the airfoil trailing edge 40. The intermediate stiffener 66 is arranged widthwise between the primary section first skin 60 and the primary section second skin 62. The intermediate stiffener 66, for example, extends widthwise between and is connected to (e.g., formed integral with, bonded to, etc.) the primary section first skin 60 and the primary section second skin 62.

The inner stiffeners 68 of FIG. 4 are arranged in a lengthwise extending array, where the inner stiffeners 68 within this array may be parallel with the airfoil body centerline 30 and/or slightly angularly offset (e.g., by an angle less than fifteen degrees)(15°) from the airfoil body centerline 30. The inner stiffeners 68, for example, are distributed side-by-side along a length of the airfoil body primary section 52 at the airfoil body base end 32. Each neighboring (e.g., adjacent) pair of the inner stiffeners 68 are displaced from one another by a lengthwise distance. The inner stiffener 68A closest to the leading edge outer segment 46 is displaced from the airfoil leading edge 38 and its outer segment 46 by a lengthwise distance. This inner stiffener 68A may also form the primary section side 72. The inner stiffener 68D closest to the airfoil trailing edge 40 is displaced from the airfoil trailing edge 40 by a lengthwise distance. Each of the inner stiffeners 68 extends longitudinally along a respective centerline of the respective inner stiffener 68, where each inner stiffener 68 and its centerline extend spanwise along the primary section skins 60 and 62 (see FIG. 6) from the intermediate stiffener 66 to a respective distal end of the respective inner stiffener 68 at the airfoil body base end 32. Each of the inner stiffeners 68C-D is arranged widthwise next to the primary section first skin 60; e.g., but not the primary section second skin 62. Each of the inner stiffeners 68C-D, for example, extends widthwise to and is connected to (e.g., formed integral with, bonded to, etc.) the primary section first skin 60. The inner stiffeners 68C-D, for example, are (e.g., completely) uncovered/exposed at a side of the primary section second skin 62. However, referring to FIGS. 4 and 6, each of the inner stiffeners 68A-B is arranged widthwise between both the primary section first skin 60 and the primary section second skin 62. Each of the inner stiffeners 68A-B of FIGS. 4 and 6, for example, extends widthwise between and is connected to (e.g., formed integral with, bonded to, etc.) the primary section first skin 60 and the primary section second skin 62.

The end stiffener 70 of FIG. 4 is arranged spanwise at an end 74 of the airfoil body primary section 52, which primary section end 74 partially forms the shoulder 50. The end stiffener 70 is abutted against the outer stiffeners 64A-B. The end stiffener 70 may also be connected to (e.g., formed integral with, bonded to, etc.) the outer stiffeners 64A-B. The end stiffener 70 extends longitudinally along a centerline, where end stiffener 70 and its centerline extend lengthwise along the primary section skins 60 and 62 between and to opposing ends of the end stiffener 70. The first end is located at the primary section side 72. The second end is located at the leading edge outer segment 46. The end stiffener 70 is arranged widthwise between the primary section first skin 60 and the primary section second skin 62. The end stiffener 70, for example, extends widthwise between and is connected to (e.g., formed integral with, bonded to, etc.) the primary section first skin 60 and the primary section second skin 62.

Referring to FIGS. 5 and 6, the primary section first skin 60 is configured at the airfoil first side 42. This primary section first skin 60 is configured as a relatively thin panel/sheet of material. Referring to FIG. 4, the primary section first skin 60 extends spanwise, along the airfoil trailing edge 40 from the airfoil tip end 34 to the airfoil body base end 32. The primary section first skin 60 extends spanwise, along the leading edge outer segment 46, from the airfoil tip end 34 to the primary section end 74. The primary section first skin 60 also extends spanwise, along the primary section side 72, from the primary section end 74 to the airfoil body base end 32. The primary section first skin 60 extends lengthwise, along the airfoil tip end 34, from the leading edge outer segment 46 to the airfoil trailing edge 40. The primary section first skin 60 extends lengthwise, along the primary section end 74, between and to the leading edge outer segment 46 and the primary section side 72. The primary section first skin 60 also extends lengthwise, along the airfoil body base end 32, from the airfoil trailing edge 40 to the primary section side 72.

Referring to FIGS. 5 and 6, the primary section second skin 62 is configured at the airfoil second side 44. This primary section second skin 62 is configured as a relatively thin panel/sheet of material. Referring to FIG. 4, the primary section second skin 62 extends spanwise, along the airfoil trailing edge 40 from the airfoil tip end 34 to the intermediate stiffener 66. The primary section second skin 62 extends spanwise, along the leading edge outer segment 46, from the airfoil tip end 34 to the primary section end 74. The primary section second skin 62 also extends spanwise, along the primary section side 72, from the primary section end 74 to the airfoil body base end 32. The primary section second skin 62 extends lengthwise, along the airfoil tip end 34, from the leading edge outer segment 46 to the airfoil trailing edge 40. The primary section second skin 62 extends lengthwise, along the primary section end 74, between and to the leading edge outer segment 46 and the primary section side 72. The primary section second skin 62 extends lengthwise, along the intermediate stiffener 66, from the airfoil trailing edge 40 to the primary section side 72. The primary section second skin 62 also extends lengthwise, along the airfoil body base end 32, from the inner stiffener 68B to the primary section side 72.

The airfoil body primary section 52 and its various elements 60, 62, 64, 66, 68 and/or 70 may be configured together as a monolithic body. Herein, the term "monolithic" may described a single, unitary body formed (e.g., resin pressure molded (RPM), resin transfer molded (RTM) or otherwise constructed) as a single collective mass of material. The term "monolithic" may also describe herein a single, unitary body formed from discrete elements that are permanently attached together via, for example, fusion, welding and/or an adhesive (e.g., epoxy resin). A non-monolithic body, by contrast, includes discretely formed bodies which are removably attached together; e.g., mechanically fastened together, brazed together, etc.

The airfoil body primary section 52 and its various elements 60, 62, 64, 66, 68 and/or 70 may be constructed from polymeric material; e.g., thermoset material and/or thermoplastic material. Each of the primary section elements 60, 62, 64, 66, 68 and/or 70, for example, may be constructed from fiber reinforcement within a polymer (e.g., resin) matrix. Examples of the fiber reinforcement may include, but are not limited to, fiberglass, carbon fiber, aramid fiber or a combination of one or more of the foregoing. The fiber reinforcement may be in the form of discrete particles, fibers and/or collected (e.g., woven) together in a mat or a sheet. The airfoil body primary section 52 may thereby be constructed as a monolithic composite body. The present disclosure, however, is not limited to such an exemplary construction.

Figure 7:
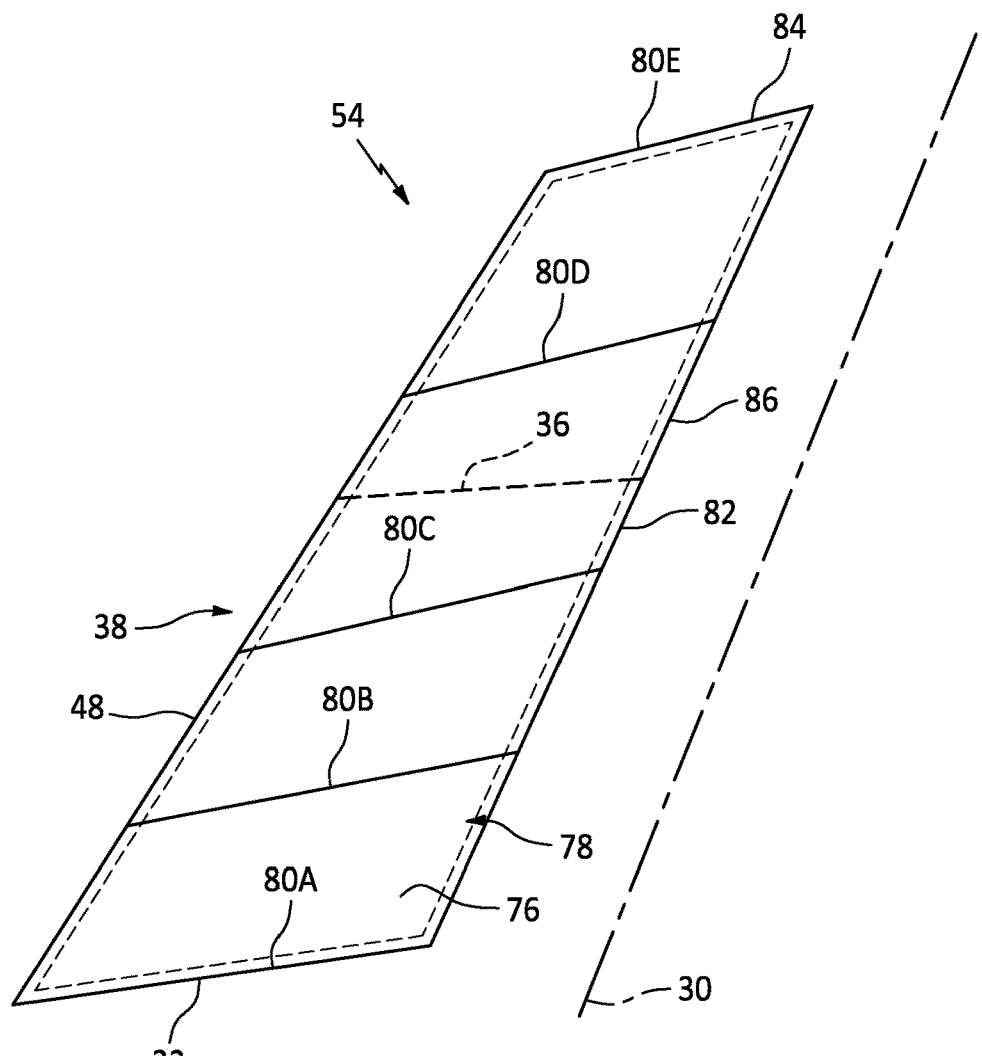
FIG. 7 is a side view illustration of a secondary section of the airfoil body with its closest skin shown in transparent form via dashed lines.
Figure 8:
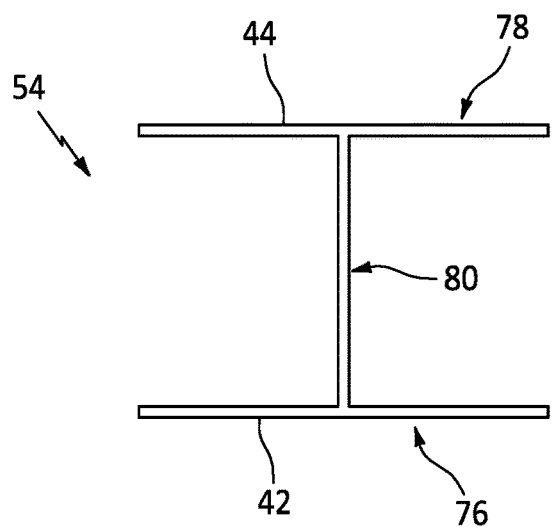
FIG. 8 is a cross-sectional illustration of a portion of the airfoil body secondary section.

Referring to FIG. 7, the airfoil body secondary section 54 includes an internal support structure. Referring to FIG. 8, the airfoil body secondary section 54 also includes a secondary section first skin 76 and a secondary section second skin 78 (generally shown via dashed line in FIG. 7).

Referring to FIG. 7, the secondary section support structure is configured to support (e.g., provide a frame for) the secondary section skins 76 and 78 (see FIG. 8). The secondary section support structure of FIG. 7 includes a plurality of secondary section stiffeners 80A-E (generally referred to as "80") and 82. These secondary section stiffeners 80 and 82 may be configured as ribs, spars, bulkheads and/or sidewalls internal to the airfoil body secondary section 54.

The side stiffeners 80 of FIG. 7 are arranged in a spanwise extending array, where the side stiffeners 80 within this array may be parallel with the camber line 36 and/or slightly angularly offset (e.g., by an angle less than fifteen degrees) (15°) from the camber line 36. The side stiffeners 80, for example, are distributed side-by-side along a span of the airfoil body secondary section 54 at the leading edge inner segment 48. Each neighboring (e.g., adjacent) pair of the side stiffeners 80 are displaced from one another by a spanwise distance. One of the side stiffeners 80A is located at the airfoil body base end 32. One of the side stiffeners 80E is located an end 84 of the airfoil body secondary section 54. Each of the side stiffeners 80 extends longitudinally along a respective centerline of the respective side stiffener 80, where each side stiffener 80 and its centerline extend lengthwise along the secondary section skins 76 and 78 (see FIG. 8) from the base stiffener 82 to a respective distal end of the respective side stiffener 80 at the leading edge inner segment 48. Referring to FIG. 8, each of the side stiffeners 80 is arranged widthwise between the secondary section first skin 76 and the secondary section second skin 78. Each of the side stiffeners 80 of FIG. 8, for example, extends widthwise between and is connected to (e.g., formed integral with, bonded to, etc.) the secondary section first skin 76 and the secondary section second skin 78.

The base stiffener 82 of FIG. 7 is arranged lengthwise at a side 86 of the airfoil body secondary section 54. This base stiffener 82 is abutted lengthwise against the side stiffeners 80. The base stiffener 82 may also be connected to (e.g., formed integral with, bonded to, etc.) the side stiffeners 80. The base stiffener 82 extends longitudinally along a centerline, where base stiffener 82 and its centerline extend spanwise along the secondary section skins 76 and 78 (see FIG. 8) between and to opposing ends of the base stiffener 82. The inner end is located at the airfoil body base end 32. The outer end is located at the secondary section end 84. Referring to FIG. 8, the base stiffener 82 is arranged widthwise between the secondary section first skin 76 and the secondary section second skin 78. The base stiffener 82 of FIG. 8, for example, extends widthwise between and is connected to (e.g., formed integral with, bonded to, etc.) the secondary section first skin 76 and the secondary section second skin 78.

Referring to FIG. 8, the secondary section first skin 76 is configured at the airfoil first side 42. This secondary section first skin 76 is configured as a relatively thin panel/sheet of material. Referring to FIG. 7, the secondary section first skin 76 extends spanwise, along the leading edge inner segment 48 and the secondary section side 86, from the secondary section end 84 to the airfoil body base end 32. The secondary section first skin 76 extends lengthwise, along the secondary section end 84 and the airfoil body base end 32, from the secondary section side 86 to the leading edge inner segment 48.

Referring to FIG. 8, the secondary section second skin 78 is configured at the airfoil second side 44. This secondary section second skin 78 is configured as a relatively thin panel/sheet of material. Referring to FIG. 7, the secondary section second skin 78 extends spanwise, along the leading edge inner segment 48 and the secondary section side 86, from the secondary section end 84 to the airfoil body base end 32. The secondary section second skin 78 extends lengthwise, along the secondary section end 84 and the airfoil body base end 32, from the secondary section side 86 to the leading edge inner segment 48.

The airfoil body secondary section 54 and its various elements 76, 78, 80 and/or 82 may be configured together as a monolithic body. The airfoil body secondary section 54 and its various elements 76, 78, 80 and/or 82 may be constructed from polymeric material; e.g., thermoset material and/or thermoplastic material. Each of the primary section elements 76, 78, 80 and/or 82, for example, may be constructed from fiber reinforcement within a polymer (e.g., resin) matrix. Examples of the fiber reinforcement may include, but are not limited to, fiberglass, carbon fiber, aramid fiber or a combination of one or more of the foregoing. The fiber reinforcement may be in the form of discrete particles, fibers and/or collected (e.g., woven)

together in a mat or a sheet. The airfoil body secondary section 54 may thereby be constructed as a monolithic composite body. The present disclosure, however, is not limited to such an exemplary construction.

Figure 9:
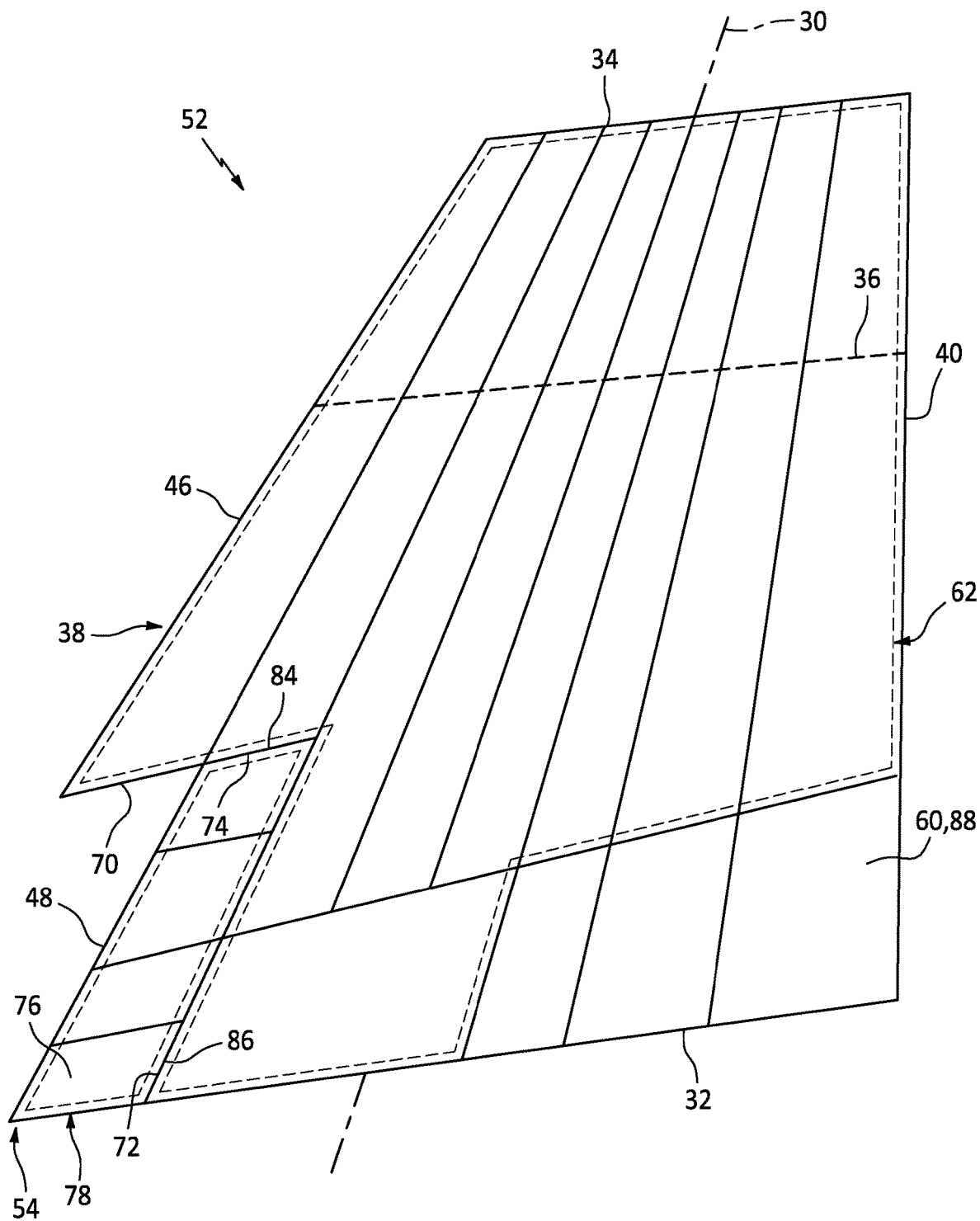
FIG. 9 is side view illustration of the airfoil body secondary section attached to the airfoil body primary section with the closest skins shown in transparent form via dashed lines.

Referring to FIG. 9, the airfoil body secondary section 54 is mated with the airfoil body primary section 52. The secondary section side 86 of FIG. 9, for example, is abutted lengthwise against the primary section side 72. The secondary section end 84 is abutted spanwise against the primary section end 74. The airfoil body secondary section 54 is mechanically fastened to the airfoil body primary section 52 via one or more fasteners; e.g., bolts. However, in other embodiments, the airfoil body secondary section 54 may also or alternatively be bonded or otherwise attached to the airfoil body primary section 52. With this arrangement, the primary section first skin 60 and the secondary section first skin 76 may collectively (e.g., and completely) form a first skin 88 (see also FIG. 3) of the airfoil body 26 at the airfoil first side 42.

Referring to FIG. 2, the side cover 56 is mechanically fastened to the airfoil body primary section 52 via one or more fasteners; e.g., bolts. However, in other embodiments, the side cover 56 may also or alternatively be bonded or otherwise attached to the airfoil body primary section 52. This side cover 56 is configured as an extension of the primary section second skin 62 and the secondary section second skin 78. With the foregoing arrangement, the primary section second skin 62, the secondary section second skin 78 and the side cover 56 may collectively (e.g., and completely) form a second skin 90 of the airfoil body 26 at the airfoil second side 44; see also FIG. 3.

Figure 10:
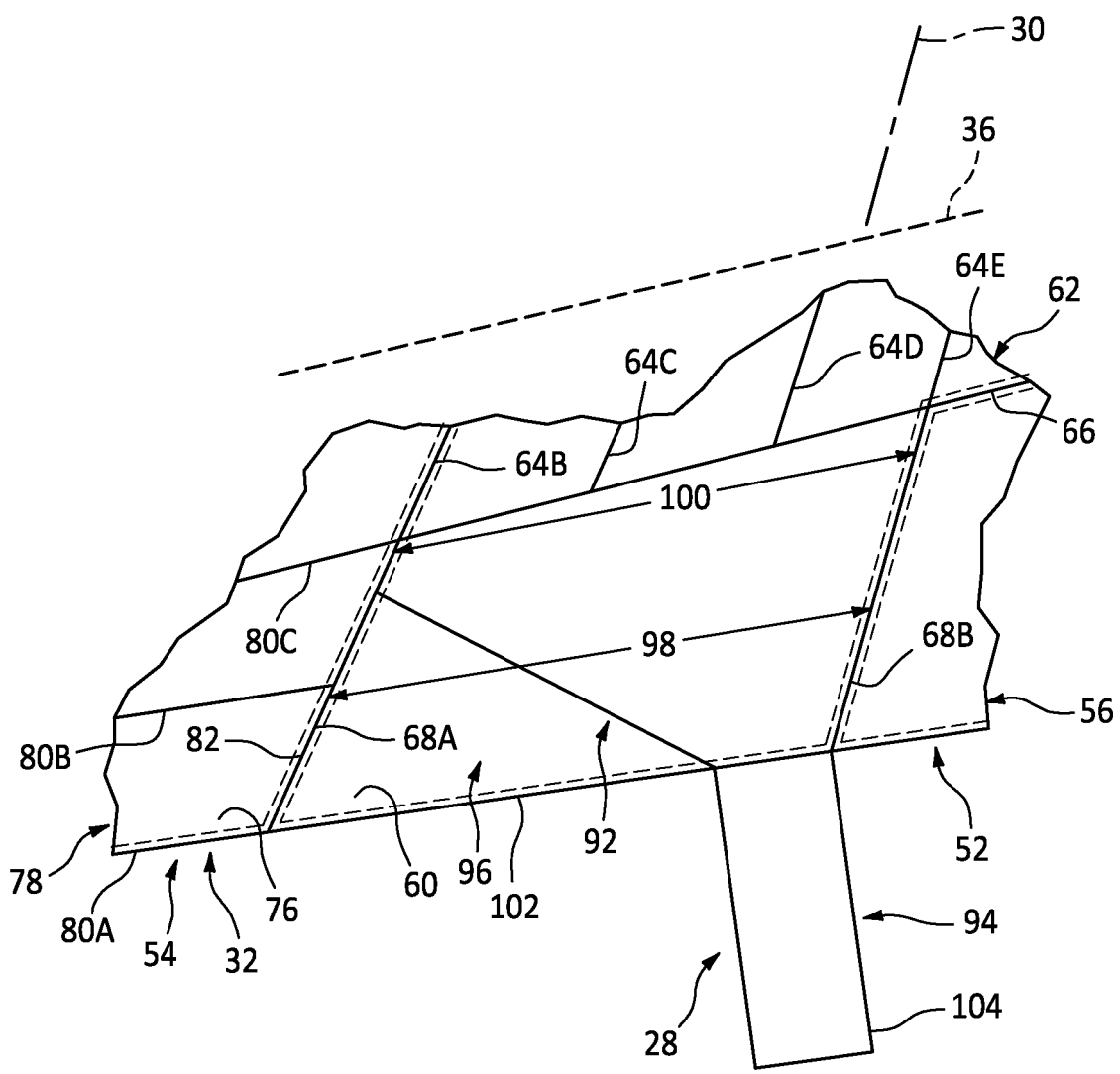
FIG. 10 is a side view illustration of a portion of the aircraft airfoil with a pivot fitting, where the closest skins are shown in transparent form via dashed lines.

Referring to FIG. 10, the airfoil fitting 28 includes a fitting mount 92 and a fitting attachment 94. The fitting mount 92 is mated with a receptacle 96 (e.g., a cavity) of the airfoil body 26. This receptacle 96 projects spanwise into the airfoil body primary section 52 from the airfoil body base end 32 to the intermediate stiffener 66. The receptacle 96 extends lengthwise within the airfoil body primary section 52 between and to the inner stiffeners 68A-B. The receptacle 96 extends widthwise within the airfoil body primary section 52 between and to the primary section first skin 60 and the primary section second skin 62.

The receptacle 96 is configured with a lengthwise dimension 98 between the inner stiffeners 68A-B. This lengthwise dimension 98 may be substantially uniform (e.g., constant) as the receptacle 96 projects spanwise into the airfoil body primary section 52 from the airfoil body base end 32 to the intermediate stiffener 66. Alternatively, the lengthwise dimension 98 may decrease in value as the receptacle 96 extends spanwise towards (or to) the intermediate stiffener 66. With this arrangement, the fitting mount 92 may be inserted in a spanwise direction into the receptacle 96, particularly where a maximum value of a lengthwise dimension 100 of the fitting mount 92 is equal to or less than a minimum value of the lengthwise dimension 98, for example, at an opening 102 to the receptacle 96 in the airfoil body base end 32.

The fitting mount 92 is mechanically fastened to the airfoil body primary section 52 via one or more fasteners; e.g., bolts. However, in other embodiments, the fitting mount 92 may also or alternatively be bonded or otherwise attached to the airfoil body primary section 52.

Referring to FIG. 3, the trailing edge end cover 58 is mechanically fastened to the airfoil body primary section 52 via one or more fasteners; e.g., bolts. However, in other embodiments, the trailing edge end cover 58 may also or alternatively be bonded or otherwise attached to the airfoil body primary section 52. This trailing edge end cover 58 extends lengthwise from the fitting mount 92 to (or about) the airfoil trailing edge 40. The trailing edge end cover 58 extends widthwise between and to (or about) the first skin 88 and the second skin 90 and, more particularly, between and to the primary section first skin 60 and the side cover 56.

The leading edge end cover 57 is mechanically fastened to the airfoil body primary section 52 and/or the airfoil body secondary section 54 via one or more fasteners; e.g., bolts. However, in other embodiments, the leading edge end cover 57 may also or alternatively be bonded or otherwise attached to the airfoil body primary section 52 and/or the airfoil body secondary section 54. This leading edge end cover 57 extends lengthwise from the fitting mount 92 to (or about) the leading edge inner segment 48. The leading edge end cover 57 extends widthwise between and to (or about) the first skin 88 and the second skin 90 and, more particularly, between and to the section first skins 60 and 76 and the section second skins 62 and 78.

Referring to FIG. 10, the fitting attachment 94 projects out from the airfoil body 26 and its base end 32 to a distal end of the fitting attachment 94. The fitting attachment 94 of FIG. 10 is configured as or otherwise includes a shaft 104. Referring to FIG. 1, this shaft 104 is configured to mate with a receptacle in the aircraft base structure 22. With such an arrangement, the aircraft airfoil 24 may be moveably (e.g., pivotably, rotatably, etc.) attached to the aircraft base structure 22.

With the arrangement of FIG. 10, the airfoil fitting 28 may be installed and/or removed from the airfoil body 26 with relatively few steps. For example, the airfoil fitting 28 may be removed following removal of the leading edge end cover 57 and its fasteners as well as removal of the fasteners connecting the fitting mount 92 to the airfoil body primary section 52. The airfoil fitting 28 may thereby be relatively quickly inspected and/or replaced as needed with relatively little aircraft downtime.

The airfoil body 26 described above may also facilitate manufacture of the airfoil body 26 and one or more of its elements 52, 54, 56, 57 and/or 58 using, for example, a resin pressure molding (RPM) process. The airfoil body element configurations, for example, may facilitate use of internal mandrels during formation for forming the various stiffeners and cavities therebetween.

Each of the covers 56-58 of FIG. 3 may be constructed from polymeric material; e.g., thermoset material and/or thermoplastic material. Each of the covers 56-58, for example, may be constructed from fiber reinforcement within a polymer (e.g., resin) matrix. Examples of the fiber reinforcement may include, but are not limited to, fiberglass, carbon fiber, aramid fiber or a combination of one or more of the foregoing. The fiber reinforcement may be in the form of discrete particles, fibers and/or collected (e.g., woven) together in a mat or a sheet. Each of the covers 56-58 may thereby be constructed as a monolithic composite body. The present disclosure, however, is not limited to such an exemplary construction.

The airfoil fitting 28 is constructed from a fitting material such as metal. The airfoil fitting 28, for example, may be cast, machined, additively manufactured and/or otherwise formed from metal. The present disclosure, however, is not limited to such an exemplary construction.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An apparatus for an aircraft, comprising:
an airfoil body extending spanwise between a base end and a tip end, the airfoil body extending lengthwise between a leading edge and a trailing edge, the airfoil body extending widthwise between a first side and a second side, and the airfoil body including a first skin, a second skin, a plurality of first stiffeners and a plurality of second stiffeners;
the first skin disposed at the first side;
the second skin disposed at the second side;
the plurality of first stiffeners comprising first stiffener composite material, the plurality of first stiffeners extending widthwise between and connected to the first skin and the second skin, and each of the plurality of first stiffeners having a first stiffener longitudinal centerline that extends spanwise along the first skin and the second skin;
the plurality of second stiffeners comprising second stiffener composite material, the plurality of second stiffeners extending widthwise between and connected to the first skin and the second skin, and each of the plurality of second stiffeners having a second stiffener longitudinal centerline that extends lengthwise along the first skin and the second skin;
the airfoil body comprising a first section and a second section that is attached to the first section;
the first section comprising a first portion of the first skin, a first portion of the second skin and the plurality of first stiffeners; and
the second section comprising a second portion of the first skin, a second portion of the second skin and the plurality of second stiffeners;
wherein at least one of
the first section is configured as a first monolithic body; or
the second section is configured as a second monolithic body.

2. The apparatus of claim 1, wherein the first stiffener composite material and the second stiffener composite material each comprises a fiber reinforced polymer.

3. The apparatus of claim 1, wherein
the first skin comprises first skin composite material; and
the second skin comprises second skin composite material.

4. The apparatus of claim 1, wherein
each of the plurality of first stiffeners extends spanwise to a distal first stiffener end at the tip end; and
each of the plurality of second stiffeners extends lengthwise to a distal second stiffener end at the leading edge.

5. The apparatus of claim 1, wherein
the airfoil body further includes a third stiffener and a plurality of fourth stiffeners;
the third stiffener comprises third stiffener composite material, the third stiffener is spanwise between and adjacent the plurality of first stiffeners and the plurality of fourth stiffeners, the third stiffener is widthwise between the first skin and the second skin, and the third stiffener has a third stiffener longitudinal centerline that extends lengthwise along the first skin and the second skin; and
the plurality of fourth stiffeners comprise fourth stiffener composite material, the plurality of fourth stiffeners are widthwise between the first skin and the second skin, and each of the plurality of fourth stiffeners has a fourth stiffener longitudinal centerline that extends spanwise along the first skin and the second skin.

6. The apparatus of claim 5, wherein
each of the plurality of first stiffeners extend spanwise from the third stiffener to a distal first stiffener end at the tip end;
each of the plurality of fourth stiffeners extend spanwise from the third stiffener to a distal fourth stiffener end at the base end.

7. The apparatus of claim 5, wherein
one or more of the plurality of second stiffeners are spanwise aligned with the plurality of first stiffeners; and
one or more of the plurality of second stiffeners are spanwise aligned with the plurality of fourth stiffeners.

8. The apparatus of claim 1, wherein
the leading edge includes a first segment and a second segment;
the first segment is arranged at the tip end;
the second segment is arranged at the base end and lengthwise recessed inward from the first segment; and
the plurality of second stiffeners are arranged along the second segment.

9. The apparatus of claim 1, wherein the first section is mechanically attached to the second section.

10. The apparatus of claim 1, further comprising:
a fitting including a mount and a shaft;
the mount received within a cavity of and attached to the airfoil body; and
the shaft projecting away from the airfoil body to a distal shaft end.

11. The apparatus of claim 1, further comprising an aircraft stabilizer comprising the airfoil body.

12. An apparatus for an aircraft, comprising:
an airfoil body extending spanwise between a base end and a tip end, the airfoil body extending lengthwise between a leading edge and a trailing edge, the airfoil body extending widthwise between a first side and a second side, and the airfoil body including a first skin, a second skin, a plurality of first stiffeners and a plurality of second stiffeners;
the first skin disposed at the first side;
the second skin disposed at the second side;
the plurality of first stiffeners comprising first stiffener composite material, the plurality of first stiffeners extending widthwise between and connected to the first skin and the second skin, and each of the plurality of first stiffeners having a first stiffener longitudinal centerline that extends spanwise along the first skin and the second skin;
the plurality of second stiffeners comprising second stiffener composite material, the plurality of second stiffeners extending widthwise between and connected to the first skin and the second skin, and each of the plurality of second stiffeners having a second stiffener longitudinal centerline that extends lengthwise along the first skin and the second skin;
the airfoil body comprising a first section and a second section that is attached to the first section;

the first section comprising a first portion of the first skin, a first portion of the second skin and the plurality of first stiffeners;

the second section comprising a second portion of the first skin, a second portion of the second skin and the plurality of second stiffeners;

the airfoil body further comprising a cover;

the cover attached to the first section;

the cover spanwise and lengthwise overlapping a portion of the first section; and the cover forming a third portion of the first skin.

13. An apparatus for an aircraft, comprising:

an airfoil body extending spanwise between a base end and a tip end, the airfoil body extending lengthwise between a leading edge and a trailing edge, the airfoil body extending widthwise between a first side and a second side, and the airfoil body including a first skin, a second skin, a first section and a second section;

the first skin forming the first side;

the second skin forming the second side;

the first section including a first portion of the first skin, a first portion of the second skin and a plurality of first stiffeners, the plurality of first stiffeners comprising first stiffener polymer material, the plurality of first stiffeners connected to and extending widthwise between the first skin and the second skin, and the first section configured as a first monolithic body; and the second section mechanically attached to the first section, the second section including a second portion of the first skin, a second portion of the second skin and a plurality of second stiffeners, the plurality of second stiffeners comprising second stiffener polymer material, the plurality of second stiffeners connected to and extending widthwise between the first skin and the second skin, and the second section is configured as a second monolithic body.

14. The apparatus of claim 13, wherein each of the plurality of first stiffeners has a first stiffener centerline that extends spanwise along the first skin and the second skin; and each of the plurality of second stiffeners has a second stiffener centerline that extends lengthwise along the first skin and the second skin.

15. The apparatus of claim 13, wherein the first section extends spanwise from the base end to the tip end, and lengthwise from the leading edge to the trailing edge; and the second section extends spanwise from base end to the first section, and lengthwise from the first section to the leading edge.

16. The apparatus of claim 13, wherein the airfoil body further includes a cover mechanically attached to the first section;

the cover spanwise and lengthwise overlaps a portion of the first section; and the cover forms a third portion of the first skin.

* * * * *